(12) United States Patent
Giannopoulos et al.

(10) Patent No.: US 6,807,478 B2
(45) Date of Patent: Oct. 19, 2004

(54) IN-BUILDING NAVIGATION SYSTEM

(75) Inventors: Demetri Giannopoulos, Norwalk, CT (US); Ihor Terence Wacyk, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 178 days.

(21) Appl. No.: 10/029,805

(22) Filed: Dec. 27, 2001

(65) Prior Publication Data

US 2003/0125868 A1 Jul. 3, 2003

(51) Int. Cl.[7] .............................................. G01C 21/00
(52) U.S. Cl. ...................................... 701/207; 701/200
(58) Field of Search .............................. 701/23, 24, 25, 701/26, 27, 28, 200, 207, 208; 318/587; 180/169

(56) References Cited

U.S. PATENT DOCUMENTS

| | | | | |
|---|---|---|---|---|
| 4,309,758 A | * | 1/1982 | Halsall et al. | 180/169 |
| 4,647,784 A | * | 3/1987 | Stephens | 250/561 |
| 4,700,301 A | * | 10/1987 | Dyke | 180/169 |
| 4,773,018 A | * | 9/1988 | Lundstrom | 318/587 |
| 4,918,607 A | * | 4/1990 | Wible | 180/169 |
| 4,947,094 A | * | 8/1990 | Dyer et al. | 318/587 |
| 5,255,195 A | * | 10/1993 | Mochizuki et al. | 180/169 |
| 6,418,372 B1 | * | 7/2002 | Hofmann | 701/207 |
| 2002/0004699 A1 | * | 1/2002 | Fahraeus | 701/200 |

* cited by examiner

Primary Examiner—Gary Chin

(57) ABSTRACT

A navigation system is disclosed including a light source having a driver and an encoder. The driver and the encoder are coupled to the light source so that the light source produces a modulated light signal in accordance with a predetermined signature. The system also includes a receiver having a photosensitive detector capable of detecting the modulated light signal and a decoder capable of decoding the predetermined signature. A controller is communicatively coupled to the receiver, a memory and output device. The controller is arranged to receive the decoded predetermined signature, based upon the decoded predetermined signature, obtain at least one navigation instruction stored in the memory, and output the navigation instruction using the output device.

11 Claims, 3 Drawing Sheets

IN-BUILDING NAVIGATION SYSTEM

FIELD OF THE INVENTION

The present invention pertains generally to the field of navigation systems, and in particular, the invention relates to a position system used for navigation inside a building, structure or location using, in part, existing artificial light sources.

BACKGROUND OF THE INVENTION

Conventional navigation systems are known that can assist/guide a user to a location. For example, GPS (global positioning system) is widely used in positioning and navigation applications. GPS is a radio navigational aid using multiple satellites in high orbit around the earth with position fixes determined by range and range-rate measurements. GPS provides extremely accurate position and velocity information to users around the world. Satellites, maintained by the U.S. government, transmit coded radio frequency (RF) signals to earth-based GPS receivers. Highly accurate (within several meters) position determinations (i.e., longitude and latitude coordinates) are based on measurements of propagation times of the RF signals from the satellites.

A GPS receiver unit maybe incorporated in a mobile handset to receive signals from the GPS satellites. These signals are used to identify the position of the handset. The GPS receiver may also include or be linked to a digitally stored map to provide navigation instructions to the user. However GPS receivers need line of sight to satellites so they are potentially unreliable inside cars, buildings, and under foliage. Also GPS receivers themselves may be expensive.

Another approach consists of installing radio frequency (RF) transmitters, e.g., Bluetooth-based transmitters, in a building. Bluetooth wireless technology is a low-cost, low-power, short-range radio link for mobile devices and for WAN/LAN access points. It offers digital transmissions of both voice and data over the globally available 2.4 GHz ISM (Industrial, Scientific and Medical) band. The transmission range of Bluetooth transmitters is typically less than 10 m. A wireless receiver placed in the vicinity of a transmitter will receive the corresponding signal thus identifying its position. Radio frequency transmission, however, is sensitive to interference from other RF devices. The frequency bands of the RF devices are also heavily regulated by the U.S. Federal Government.

It has been proposed in the past to use existing lighting infrastructure in buildings to transmit signals by modulating the light output of light sources (see, e.g., U.S. Pat. Nos. 3,900,404 and 6,198,230). In such systems, a photosensitive detector is used to receive the transmitted information. Input data (audio, analog data, or digital data) is fed to a modulation circuit with modulates the light output (see FIG. 1). The transmission bit-rate is limited by the maximum modulation frequency of the output of the light source. Furthermore the light sources must be tied into a network to receive the data input.

As discussed above, for in-building positioning and navigation applications, GPS is not reliable and the GPS receivers are expensive. The installation of radio frequency transmitters throughout a building to form a positioning system requires the installation of additional infrastructure. Furthermore the use of radio frequency is subject to regulations. Also conventional methods for transmitting data by modulating the light output require a network to send the data to the light source driver. In these systems, the transmission data-rate is limited by the maximum modulation frequency of the light output.

Accordingly, there is a need for a in-building navigation system that solves the shortcomings of the above-described systems.

BRIEF SUMMARY OF THE INVENTION

One aspect of the present invention uses existing lighting infrastructure (e.g., fluorescent lamps and fluorescent lamp drivers) in a building or structure to form an in-building positioning system. This arrangement typically does not require any additional infrastructure cost. The lighting infrastructure may be any type of light source, such as fluorescent, halogen or incandescent light sources. It is noted that incandescent light sources will require a modulation driver circuit. The building or structure can be any type of house, office, arena, complex or location that include some sort of artificial lighting.

Various embodiments of the invention can be used to add in navigating a user within a building. Application examples of this invention include:

finding a particular store in a mall;

finding a room or a specific facility in a hotel;

locating an item in a supermarket or a warehouse;

finding a gate of a specific facility in an airport; and locating a seat in sports arena.

One embodiment of the present invention is directed to a positioning system used for navigation inside a building, structure, arena or location. Light sources used as beacons to transmit unique codes by modulating their light output. The transmitted codes are decoded by an optical receiver and are used in combination with a digital building map stored in the receiver to provide navigation instructions to the user within a building (e.g., mall, hotel or airport).

In one embodiment, a navigation system includes a light source having a driver and an encoder. The driver and the encoder are coupled to the light source so that the light source produces a modulated light signal in accordance with a predetermined signature. A receiver is provided having a photosensitive detector capable of detecting the modulated light signal and a decoder capable of decoding the predetermined signature. A controller is communicatively coupled to the receiver, a memory and an output device. The controller is arranged to receive the decoded predetermined signature, based upon the decoded predetermined signature, obtain at least one navigation instruction stored in the memory, and output the navigation instruction using the output device.

In another embodiment, an optical receiver is provided for operation with the navigation system.

Yet another embodiment is directed to a navigation system including means for producing a light signal having a signature, means for decoding the signature from the light signal and means for providing a navigation instruction in accordance with the signature.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF EMBODIMENTS

Figure 1:
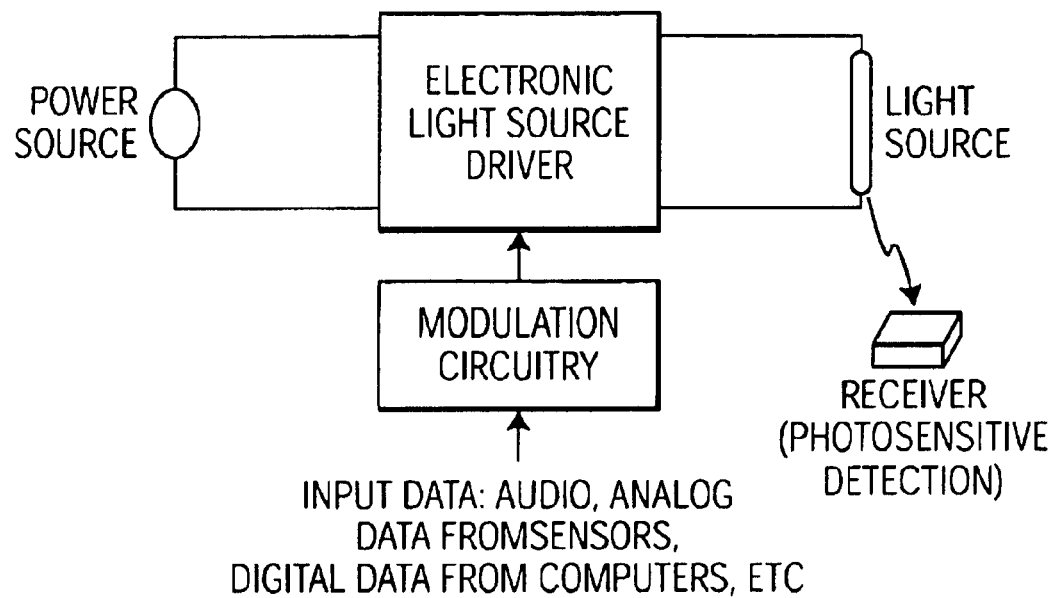
FIG. 1 is a conventional lighting system.
Figure 2:
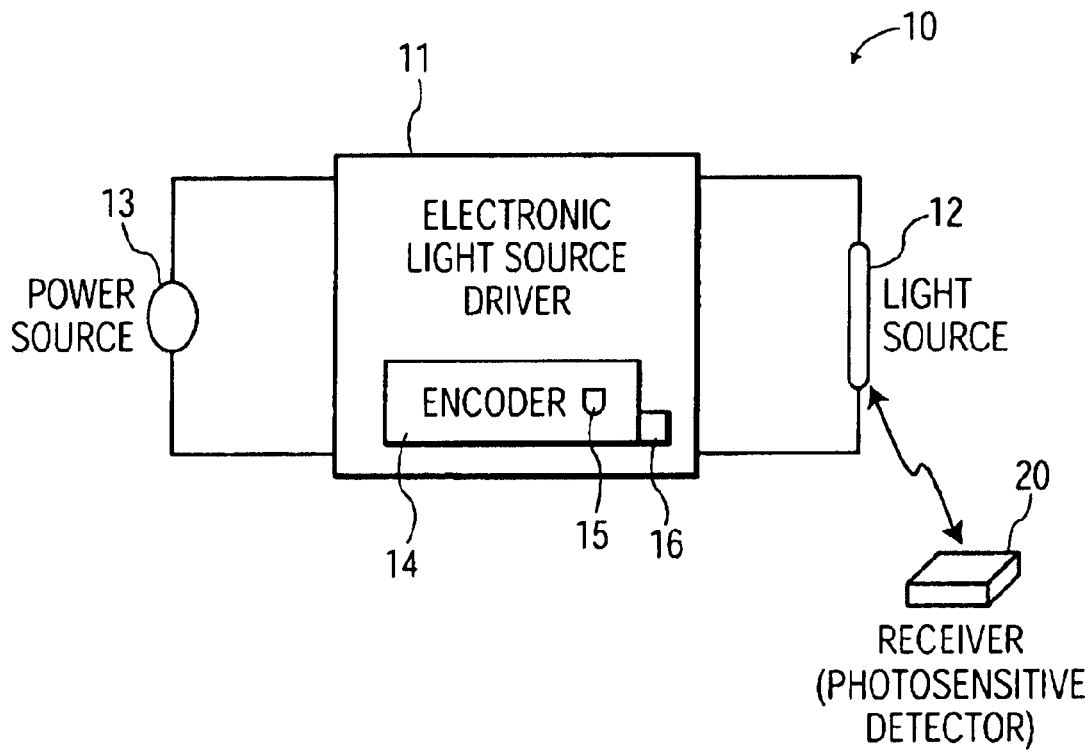
FIG. 2 is a light encoding system in accordance with one aspect of the invention.

Referring now to FIG. 2, a navigation system 10 is shown, which includes a driver 11, a light source 12 and a power source 13. The driver 11 includes an encoder 14 for encoding a unique code 15 which is transmitted by modulating light emitted from the light source 12. In this way, the light is modulated to have a signature in accordance with the unique code 15. The light source 12 and the driver 11 may be supplied (from a manufacturer) with the unique code 15. The unique code 15 may also be programmable via an interface 16. The interface may be a data input port or a wireless data interface (e.g., infrared or radio frequency (RF)).

A plurality of light encoding systems 10 each would have a different unique code 15 associated therewith. The unique code 15 may consist of a plurality of bits. The number of bits is chosen to be high enough to ensure at least that in practice no two installed light encoding systems 10 in a building share the same unique code 15. Various alternative formats may be used the unique code 15. The follows are examples of possible unique codes 15 and are not intended to be limiting:

00h through 0fh: provides 16 unique (hexadecimal) codes

XYh: where X (0 through f) is a region designation and Y (0 through f) is a light source designation within each region aabbcccc (binary) where aa represents a location classification (e.g., mall, office), bb represents a floor number and cccc represents a light source designation within a particular location and on a particular floor.

The unique code 15 may be transmitted/modulated at regular intervals, e.g., once per second, or only at specific times as needed. In the case of the regular intervals of once per second, the transmission bit-rate of the unique code 15 can be very low, for instance 200 bits/second (which is not visible to the human eye). This bit rate simplifies the design of a receiver 20 and reduces its power consumption. The transmission of data in the previous art typically requires much higher bit-rate. Also it is generally easier to modulate the light output at a lower frequency. Alternatively, the unique code 15 may only be transmitted/modulated when prompted by an external trigger. The trigger may be an input received via the interface 16. The input may be from the receiver 20 (discussed below).

It is also noted that the light encoding system 10 does not need receive any input data to transmit. As discussed above, the unique code 15 is predetermined/programmed for the light source 12. Therefore there is no need to tie all light sources into a network as prior art system require. It is also noted that no regulations are imposed on light emissions or the modulation of light emissions from lighting sources.

Figure 3:
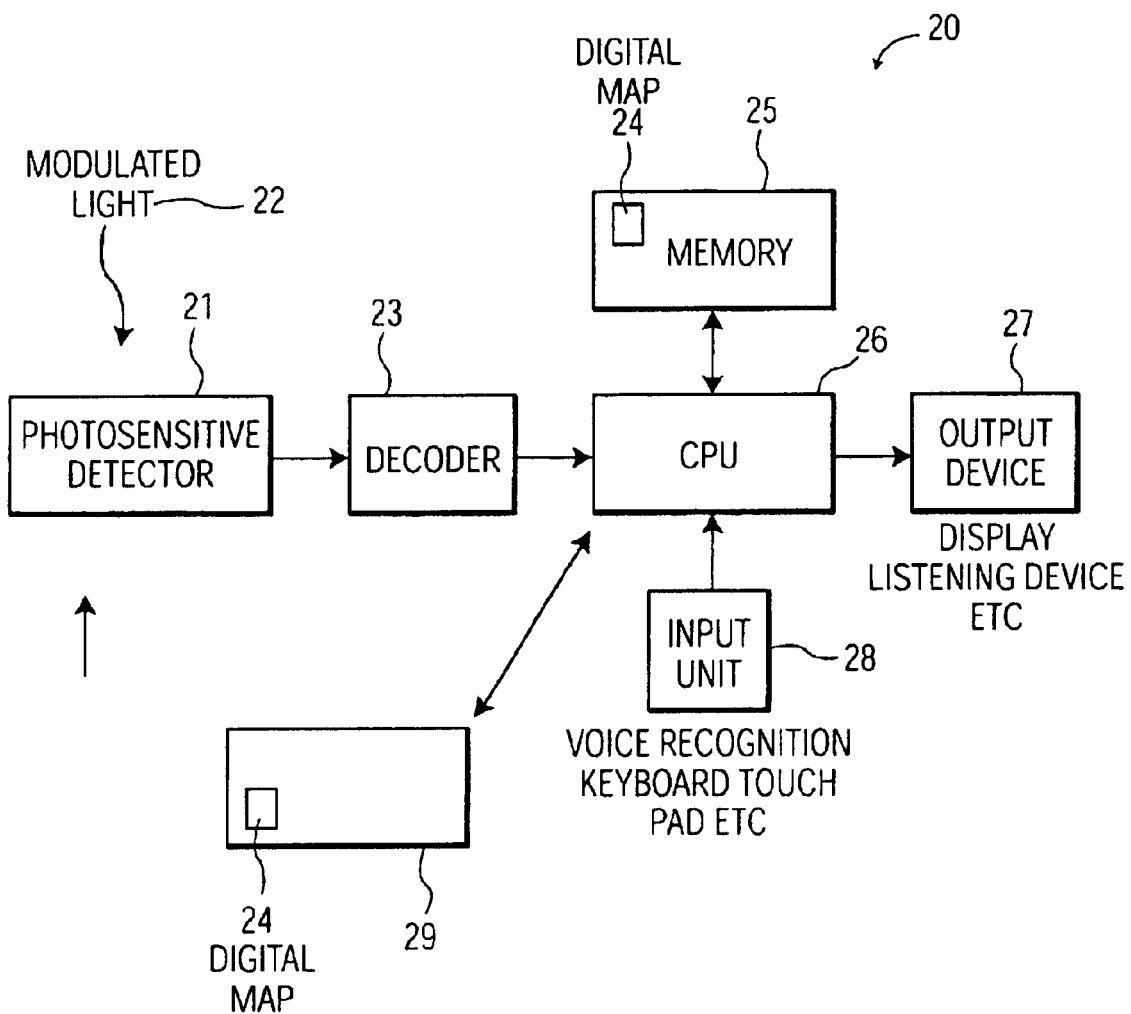
FIG. 3 is a block diagram of an optical receiver in accordance with one embodiment of the invention.

A block diagram of the receiver 20 in accordance with one embodiment is shown in FIG. 3. The receiver 20 includes a photosensitive detector 21 to detect the modulated light signal 22 and a decoder 23 to extract the unique code 15 from the modulated light signal 22. The unique code 15 is associated with a location of the light source 12 in a digital map 24 of the building stored in a memory 25. Using the unique code 15 from one or more light sources 12 and the digital map 24, the current position of a user can be determined. Based upon the current position, instructions can be provided to the user to reach a specific location.

One difference between the present invention from the conventional systems using light output modulation to transmit data is the use of the memory 25 to store navigation instructions instead of having to transmit a large amount of information related to a building map or navigation instructions. The modulated light only needs to include the unique code 15. The unique code 15 is used to retrieve the relevant information from the memory 15. The overall processing of unique codes 15 and navigation instruction is performed by a CPU 26 or controller.

The CPU 26 may also include a communication interface, a memory interface, a CD-ROM drive interface and a video interface (not shown). The CPU 26 comprises a microprocessor or the like for executing computer readable code, i.e., applications, such those noted above, out of the memory 25. Such applications may be stored in memory 25 or, alternatively, on a floppy disk in disk drive 36 or a CD-ROM in a CD-ROM drive. The CPU 26 accesses the applications (or other data) stored on a floppy disk via the memory interface and accesses the applications (or other data) stored on a CD-ROM via CD-ROM drive interface.

As noted above, the functions of the system 10 are implemented by computer readable code executed by a data processing apparatus. The code may be stored in a memory within the data processing apparatus or read/downloaded from a memory medium such as a CD-ROM or floppy disk. In other embodiments, however, hardware circuitry may be used in place of, or in combination with, software instructions to implement the invention. These functions/software/hardware may be formed as part of the receiver 20 or be an adjunct unit. The invention, for example, can also be implemented on a Personal Digital Assistant, laptop computer or a cellular telephone.

The receiver 20 also includes an output device 27. The output device 27 may include a variety of audio and visual units. The output device may also be a separate unit coupled to the CPU 26. For example, the output device 27 may be a personal computer or a cellular phone.

The receiver 20 may also include an input unit 28. The input unit 28 may comprise a variety of conventional data input devises. For example, the input unit 28 may be a keyboard, push buttons, a touch pad, a mouse, a voice recognition unit or the like. Using the input unit 28, a user of the positioning system 10 can enter information such as a desired destination. Using the input information, the CPU 26 will use the output device 27 to communicate to the user the directions to his destination.

The receiver 20 may also be able to communicate to one or more of remote devices 29 over a network 30. The network 30 may be a global computer communications network such as the Internet, a wide area network, a metropolitan area network, a local area network, a cable network, a satellite network or a telephone network, as well as portions or combinations of these and other types of networks. The network 30 may be accessed by the receiver 20 through wired connections, wireless connections or combinations thereof, using well-known conventional communication protocols such as the Internet Protocol (IP).

As shown in FIG. 3, the digital map 24 information may be located at the remote site 29, e.g., a web server. The remote site 29 may include a data storage device that stores any type of multimedia information related to the digital map 24. The data storage may be any suitable storage medium such as audio/video cassettes, digital audiotapes (DAT), laser discs, DVDs, and the like.

Figure 4:
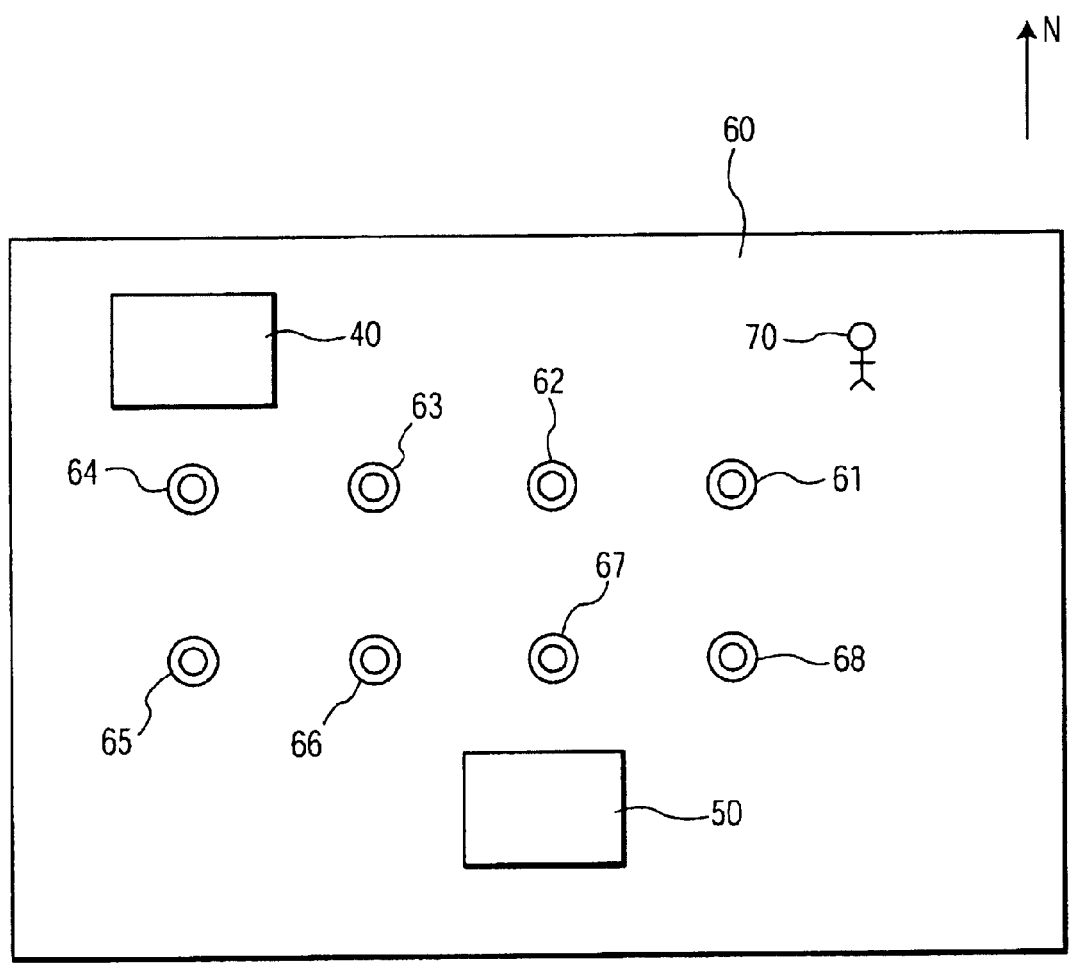
FIG. 4. is a block diagram illustrating an exemplary application of an in-building navigation system in accordance with another embodiment of the invention.

FIG. 4 a block diagram illustrating an exemplary application of the navigation system 10. In this example, a store 40 and a store 50 are located in a mall 60. A plurality of light sources 61–68 are located throughout the mall 60. A person 70 using the receiver 20 can receive navigation instructions to direct the person 70 to the store 50. As the person 70 passed by light source 61, the person 70 would receive navigation instructions, e.g., proceed south or continue straight. The navigation instructions may also be in the form of a map of the mall 60 with the person's 70 current and desired location highlighted. As the person 70 passed by the light source 68, the person 70 may receive additional navigation instructions, e.g., proceed west or proceed toward an identifiable landmark. When the person 70 was near the light source 67, the person 70 may receive a final navigation instruction, e.g., stop or at desired destination.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. A navigation system for detecting a current position of a user in a building, the navigation system comprising:
    at least one light source including a driver and an encoder, the driver and the encoder coupled to the light source so that the light source produces a modulated light signal in accordance with a predetermined signature, wherein said light source is stationary;
    a receiver, the receiver held by the user when in use, including a photosensitive detector capable of detecting the modulated light signal produced by said stationary light source and a decoder capable of decoding the predetermined signature said receiver further comprising:
        a memory;
        a controller communicatively coupled to the receiver and the memory; and
        an output device coupled to the controller,
            wherein the controller is arranged to receive the decoded predetermined signature, and based upon the decoded predetermined signature, retrieve information as to the location of said at least one light source in a digital map of the building, thereby detecting a current position of the user, to obtain at least one navigation instruction stored in the memory, and output the navigation instruction to the user using the output device.

2. The navigation system according to claim 1, wherein the predetermined signature comprises a unique binary code.

3. The navigation system according to claim 1, wherein the output device comprises an audio device or an image device.

4. The navigation system according to claim 1, wherein the memory is accessed by the controller via a communication network.

5. The navigation system according to claim 1, further comprising an input device.

6. The navigation system according to claim 5, wherein the modulated light signal is provided when a predetermined input is received by the input device.

7. The navigation system according to claim 5, wherein the predetermined signature is programmable using the input device.

8. The navigation system according to claim 5, wherein the input device comprises a keyboard, push buttons, a touch pad, a mouse or a voice recognition unit.

9. A receiver to be used within a navigation system for detecting a current position of a user in a building, the receiver held by the user when in use, and comprising:
    a photosensitive detector capable of detecting a modulated light signal;
    a decoder capable of decoding a predetermined signature from the modulated light signal;
    a memory;
    a controller communicatively coupled to the receiver and the memory; and
    an output device coupled to the controller,
        wherein the controller is arranged to receive the decoded predetermined signature, based upon the decoded predetermined signature, retrieve information as to the location of at least one light source in a digital map of the building, thereby detecting a current position of the user, to obtain at least one navigation instruction stored in the memory, and output the navigation instruction to the user using the output device.

10. The receiver according to claim 9, wherein the memory is accessed by the controller via a communication network.

11. The receiver according to claim 9, further comprising an input device.

* * * * *